(12) United States Patent
Dyson et al.

(10) Patent No.: US 9,057,560 B2
(45) Date of Patent: Jun. 16, 2015

(54) DEVELOPMENTS IN OR RELATING TO A HAND DRYER

(71) Applicant: Dyson Technology Limited, Wiltshire (GB)

(72) Inventors: James Dyson, Malmesbury (GB); Leigh Michael Ryan, Malmesbury (GB); Robert Michael Cox, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 189 days.

(21) Appl. No.: 13/656,330

(22) Filed: Oct. 19, 2012

(65) Prior Publication Data

US 2013/0097885 A1    Apr. 25, 2013

(30) Foreign Application Priority Data

Oct. 20, 2011    (GB) .................................. 1118142.7

(51) Int. Cl.
*F26B 21/00* (2006.01)
*A47K 10/48* (2006.01)
*B29C 45/00* (2006.01)

(52) U.S. Cl.
CPC ............... *F26B 21/004* (2013.01); *A47K 10/48* (2013.01); *B29C 45/0055* (2013.01); *B29C 2793/009* (2013.01)

(58) Field of Classification Search
CPC ............... F26B 3/00; F26B 5/00; F26B 9/00; F26B 21/00; F26B 21/004; F26B 25/00; F26B 25/18; B29C 44/00; B29C 44/10; B29C 45/00; B29C 45/055; A45D 20/00; A45D 21/10; A45D 20/16

USPC ......... 34/380, 381, 418, 523, 60, 80, 90, 104, 34/105, 202, 218; 239/596, 599, 597; 4/619, 628, 643
See application file for complete search history.

(56) References Cited

U.S. PATENT DOCUMENTS

| | | | | |
|---|---|---|---|---|
| 3,006,079 | A * | 10/1961 | Jepson | 34/99 |
| 3,401,426 | A * | 9/1968 | Evans | 425/565 |
| 3,647,147 | A | 3/1972 | Cook | |
| 3,955,065 | A * | 5/1976 | Chambon | 392/384 |
| 4,126,167 | A * | 11/1978 | Smith et al. | 604/317 |
| 4,295,233 | A * | 10/1981 | Hinkel et al. | 4/619 |
| 4,642,909 | A * | 2/1987 | Garcia | 34/97 |
| 4,756,094 | A * | 7/1988 | Houck, Jr. | 34/225 |
| 5,819,431 | A | 10/1998 | Lancer | |

(Continued)

FOREIGN PATENT DOCUMENTS

| | | |
|---|---|---|
| EP | 1 909 627 | 8/2009 |
| GB | 2195760 * | 4/2013 |

(Continued)

OTHER PUBLICATIONS

Search Report mailed Feb. 20, 2012 directed towards GB Application No. 1118142.7, 2 pages.
Search Report and Written Opinion mailed Mar. 20, 2013, directed to International Application No. PCT/GB2012/052474; 9 pages.

*Primary Examiner* — Steve M Gravini
(74) *Attorney, Agent, or Firm* — Morrison & Foerster LLP

(57) ABSTRACT

A method of manufacturing a nozzle part for a hand dryer. The nozzle part has a nozzle body and an air outlet aperture in the nozzle body, and the method includes molding the nozzle body from plastic as a single part and then post-machining the air outlet aperture in the molded plastic nozzle body.

11 Claims, 7 Drawing Sheets

(56) References Cited

U.S. PATENT DOCUMENTS

| | | | |
|---|---|---|---|
| 5,823,447 A | 10/1998 | Maybach | |
| 6,038,786 A * | 3/2000 | Aisenberg et al. | 34/267 |
| 2003/0150126 A1* | 8/2003 | Chang et al. | 34/96 |
| 2005/0062202 A1* | 3/2005 | Laidler | 264/328.1 |
| 2008/0216343 A1* | 9/2008 | Churchill et al. | 34/202 |
| 2009/0119942 A1 | 5/2009 | Aisenberg et al. | |
| 2010/0209080 A1* | 8/2010 | Rubin et al. | 392/380 |
| 2012/0024890 A1* | 2/2012 | Ota et al. | 222/52 |
| 2012/0324755 A1* | 12/2012 | Zhao | 34/427 |
| 2013/0097885 A1* | 4/2013 | Dyson et al. | 34/201 |
| 2013/0232807 A1* | 9/2013 | Robert et al. | 34/72 |
| 2014/0230269 A1* | 8/2014 | Bayley et al. | 34/487 |

FOREIGN PATENT DOCUMENTS

| | | | |
|---|---|---|---|
| JP | 8-164088 | | 6/1996 |
| JP | 9-135788 | | 5/1997 |
| JP | 11-283 | | 1/1999 |
| JP | 2003-153823 | | 5/2003 |
| JP | 2006-101987 | | 4/2006 |
| JP | 2007-54670 | | 3/2007 |
| JP | 2013085961 A | * | 5/2013 |
| WO | WO-2007/015042 | | 2/2007 |
| WO | WO 2013057476 | * | 4/2013 |

* cited by examiner

A-A

B-B

DEVELOPMENTS IN OR RELATING TO A HAND DRYER

REFERENCE TO RELATED APPLICATIONS

This application claims the priority of United Kingdom Application No. 1118142.7, filed 20 Oct. 2011, the entire contents of which are incorporated herein by reference.

FIELD OF THE INVENTION

The present invention relates to the field of hand dryers.

BACKGROUND OF THE INVENTION

FIG. 1 shows a section through part of a conventional hand dryer, sold under the model name AB01 as part of the Dyson Airblade® range of hand dryers. This type of hand dryer is described in some detail in European Patent EP1909627. It works by forcing the drying air through two opposing, thin air slots—each less than 1 mm wide—to create opposing thin sheets of high velocity air, or "air-knives", which act to strip water from the front and backs of a user's hands as they are 'dipped'—palms flat—between the opposing air slots.

The part a shown in FIG. 1 is one of the so-called air-knife assemblies on the hand dryer. There are two of these air-knife assemblies, one forming each of the two opposing thin air slots. Each air-knife assembly a incorporates a nozzle b, which includes the respective air slot c and which connects to the end of a main air duct d. The nozzle b comes in two moulded parts e, f which are then assembled together to form the air slot c (FIG. 3). This lends itself to convenient injection-moulding of the two parts e, f but makes it difficult accurately to control the width W of the slot c due to tolerance stacking in the final assembly of the parts e, f.

SUMMARY OF THE INVENTION

It is an object of the present invention to seek to provide an improved method of manufacturing a nozzle part for a hand dryer.

According to the present invention there is provided a method of manufacturing a nozzle part for a hand dryer, the nozzle part comprising a nozzle body and an air outlet aperture in the nozzle body, the method comprising moulding the nozzle body from plastic as a single part and then machining the air outlet aperture in the moulded plastic nozzle body.

The nozzle part does not require assembly—thus eliminating the adverse effects of tolerance stacking and making it easier to control the dimension of the outlet aperture.

This is particularly applicable to a hand dryer in which the outlet aperture is in the form of a narrow elongate slot—less than 1.5 mm in width (in particular less than 1 mm in width)—because work carried out in connection with this invention suggests that in these types of dryer, slot width is in fact a critical drying parameter: even very small variations in the slot width can have a significant effect on drying performance. Consequently, being able to eliminate the effects of tolerance stacking on the slot width in accordance with the invention makes it significantly easier to meet performance specification for these types of hand dryer.

Because the outlet aperture is post-machined, the method allows convenient moulding of the nozzle body—lending itself to economical use of injection-moulding, for example. This is particularly so in the case where the outlet aperture is a narrow elongate slot, which might require the use of relatively complicated moulding inserts to mould the slots.

The invention is particularly advantageous for manufacturing a nozzle part having a relatively long elongate air slot—greater than 100 mm in length (preferably 100 mm-160 mm in length)—because here the effects of tolerance stacking on slot width may be more acute in a multi-part nozzle assembly. For example, the invention may find particular application in hand dryers such as the Dyson Airblade® range of hand dryers, in which the length of the elongate air slot for each hand tends to be greater than 100 mm in length in order to span the width of the user's hands held—palm open—facing the slot.

The nozzle part may comprise a relatively long, elongate air slot for each hand. In this case, the elongate air slots may be combined to form a continuous air slot. In this case, each elongate slot will effectively be a separate length of the continuous, combined slot which—if each of the slots are greater than 100 mm in length—will be greater than 200 mm in length (preferably 200 mm to 320 mm in length).

By "plastic" is meant a thermosetting or thermoplastic polymer material. For example, the nozzle body may be moulded from Polycarbonate, or a blend of Polycarbonate and Acrylonitrile Butadiene Styrene, allowing convenient post-machining of the outlet aperture.

Any suitable moulding method may be used, such as injection moulding.

The elongate air slot may be machined into a part of the nozzle body which is reinforced by one or more bracing elements integrally moulded as part of the nozzle body. This provides a relatively sturdy construction, but still retains the advantages of single-part moulding of the nozzle body.

The bracing elements may be reinforcing ribs moulded on the inside of the part. These ribs effectively span the machined slot to brace the opposing walls of the slot. In this case, the post-machining step may be carried out using a radiused cutting tool which cuts part way into the reinforcing ribs. Cutting part way into the ribs helps prevent the ribs acting as dividing partitions in the slot whilst nevertheless retaining the bracing function of the ribs. Using a radiused cutting tool—such as a ball-nose or bull-nose cutter—has the advantage that it limits stress risers in the ribs. This is described in more detail below, with reference to some of the Figures.

The nozzle part may constitute, or form an integral part of, the external casing of the hand dryer. This provides for a simple construction in which the nozzle part is effectively integrated as part of the external casing of the hand dryer, making the dryer easier to clean and more hygienic.

According to a related aspect of the invention there is provided a hand dryer having a nozzle part, the nozzle part comprising a plastic-moulded nozzle body and an outlet aperture—through which drying air is ejected in use—which outlet aperture has been machined in the moulded nozzle body.

The hand dryer may be a high speed hand dryer, being arranged to eject drying air at an exit velocity greater than 100 m/s.

BRIEF DESCRIPTION OF THE DRAWINGS

Embodiments of the invention will now be described, by way of example, with reference to the accompanying drawings in which.

DETAILED DESCRIPTION OF THE INVENTION

Figure 1:
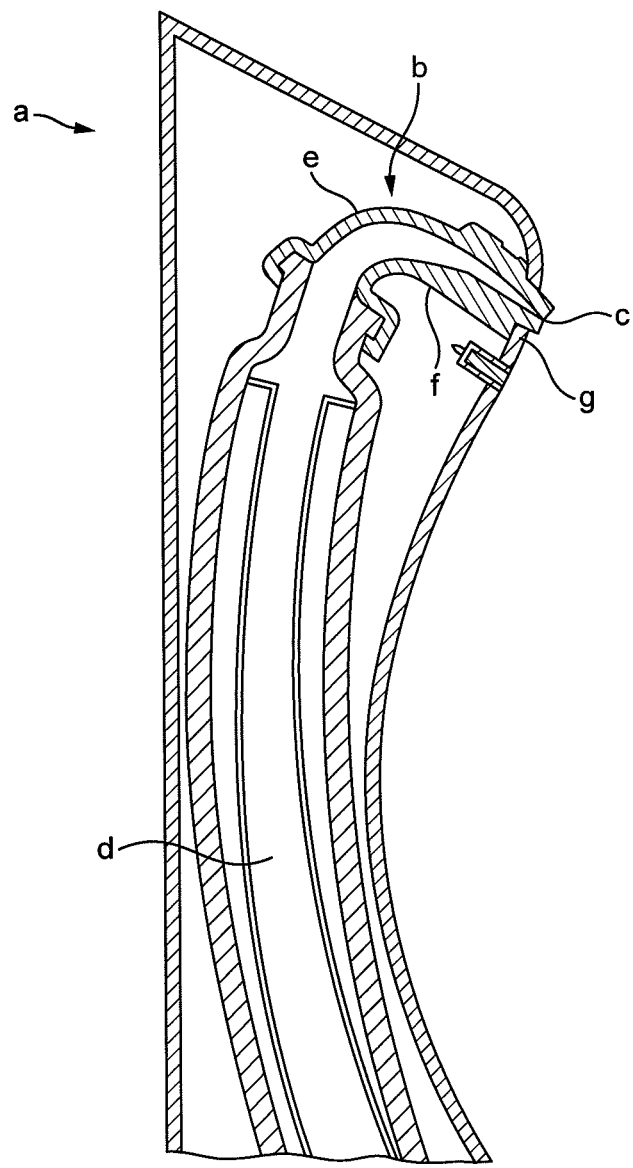
FIG. 1 is a sectional view of part of the conventional hand dryer described in European Patent EP1909627.
Figure 2:
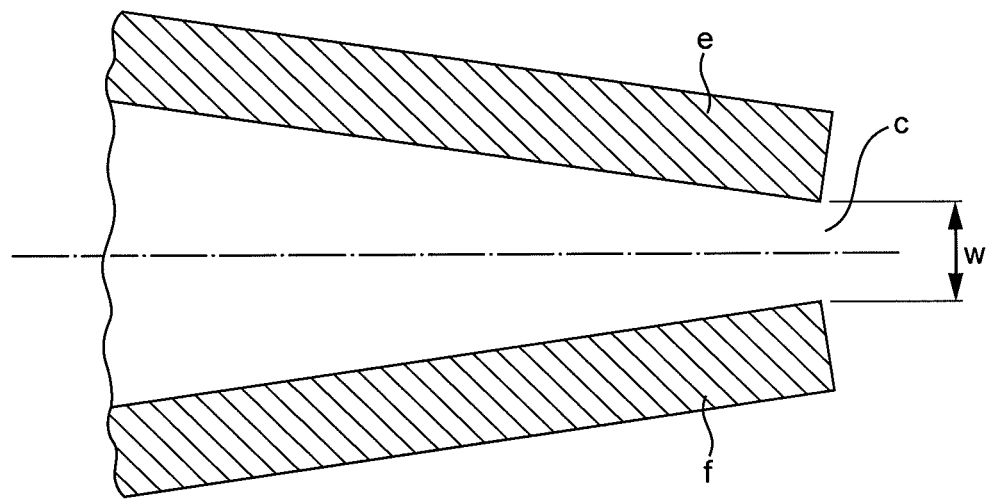
FIG. 2 is a magnified sectional view of part of the conventional hand dryer described in European Patent EP1909627.
Figure 3:
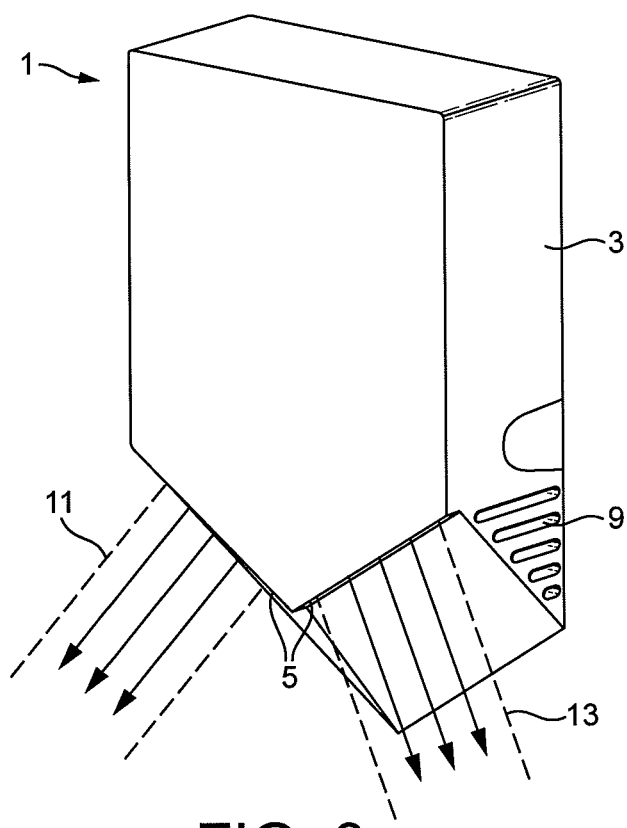
FIG. 3 is a schematic perspective view of a wall-mountable hand dryer in accordance with the present invention, shown in its normal orientation in use.
Figure 4:
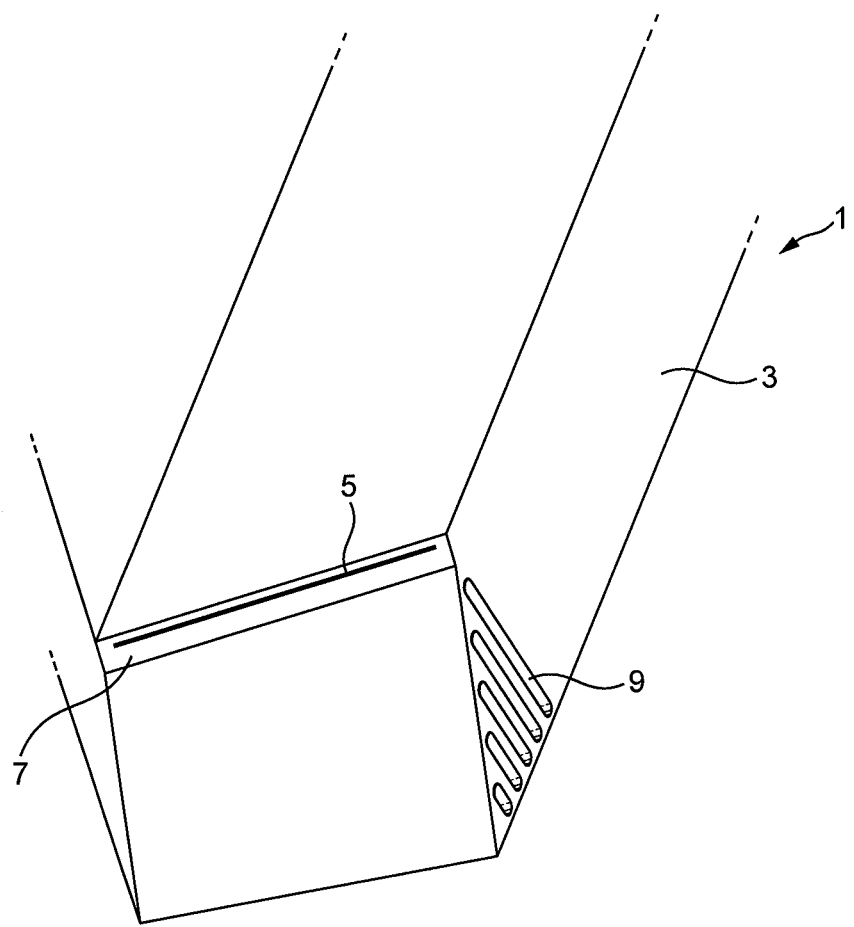
FIG. 4 is a perspective view from underneath the hand dryer shown in FIG. 3.

FIG. 3 shows a wall-mountable hand dryer 1 incorporating a nozzle part manufactured in accordance with the present invention. In this case, the nozzle part constitutes the main exterior casing 3 of the hand dryer, which incorporates a pair of outlet apertures in the form of narrow, elongate air slots 5—each approximately 0.8 mm in width. The air slots are not easily visible in FIG. 3, but one of the slots 5 is shown more clearly in FIG. 4, provided on an underside 7 of the dryer 1.

A motor-driven fan is provided inside the main casing 3, which draws air through intakes 9 on either side of the main casing 3 and forces the air at high speed (>100 m/s) out through the narrow elongate air slots 5.

Figure 5A:
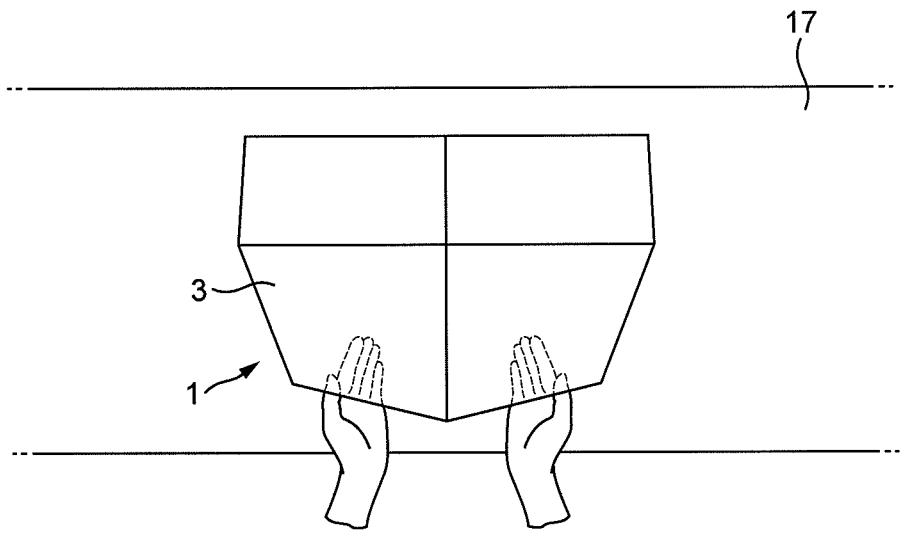
FIGS. 5a and 5b are perspective views—looking down on the dryer shown in FIG. 3—illustrating normal use of the dryer to dry the hands.
Figure 5B:
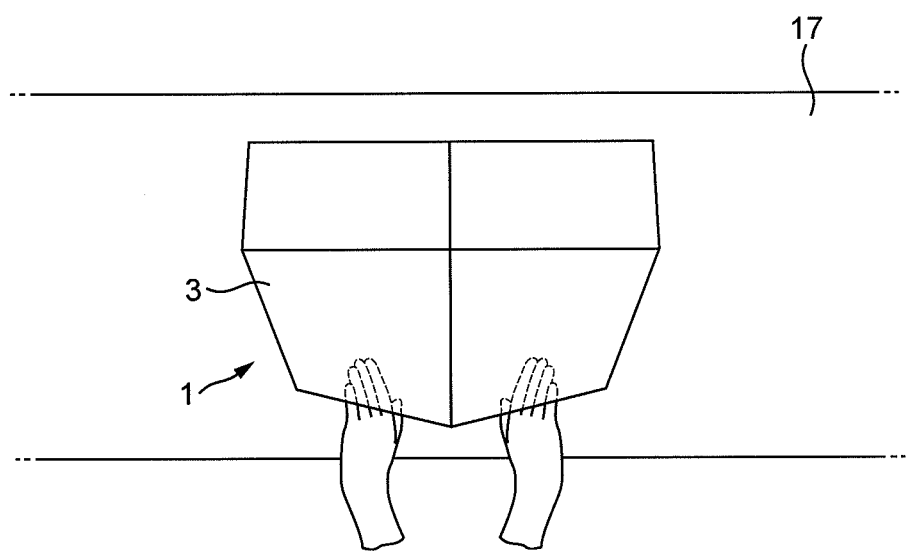

Each of the elongate air slots 5 is sufficiently long to ensure that it spans the width of a typical user's hand when it is held—palm open—facing the slot 5. A length of between 120 mm and 160 mm is considered preferable for this. In use, the dryer 1 is mounted on a wall 17. The user inserts his hands lengthwise front-to-back underneath the elongate air slots 5, as shown in FIG. 5a, and high-speed air-sheets 11, 13 (FIG. 3) are directed down onto the hands to 'scrape' water from the hands as they are subsequently withdrawn underneath the slots 5. This action is then repeated with the hands turned over to dry the reverse side of the hands (FIG. 5b).

The elongate slots 5 need to be manufactured to strict tolerances: it has been found in accordance with the invention that even small variations in the width of the slots 5 can adversely affect the drying performance of the dryer 1. This is achieved conveniently and reliably in accordance with the present invention by first moulding a nozzle body—the nozzle body in this case being the main casing without the slots—and then post-machining the slots 5 into this nozzle body to form the finished main casing.

Figure 6:
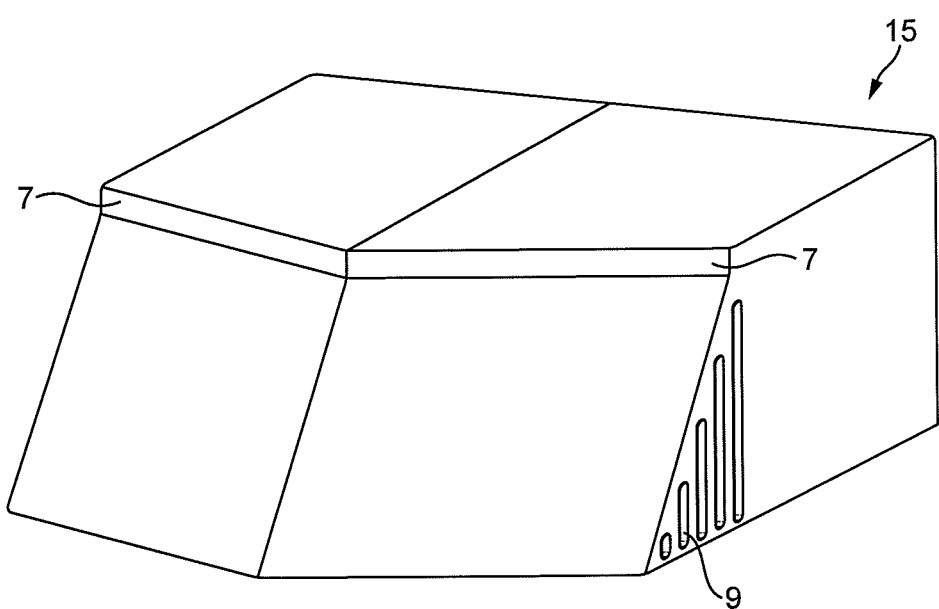
FIG. 6 is a perspective view of a moulded nozzle body for the hand dryer shown in FIG. 3.

The nozzle body 15 is shown in FIG. 6, viewed from the underneath so that the blank underside 7 is clearly visible. It may be injection-moulded from any suitable plastic, such as Polycarbonate (PC) or Acrylonitrile Butadiene Styrene (ABS), or a PC/ABS blend.

The elongate slots 5 can be machined on a conventional CNC milling machine using a suitable milling cutter.

Figure 7A:
FIG. 7a is an external front view of an elongate air slot machined using a disc cutter, intended to illustrate the end profile of the slot.
Figure 7B:
FIG. 7b is a sectional view along line A-A in FIG. 7a, further illustrating the end profile of the slot.
Figure 8A:
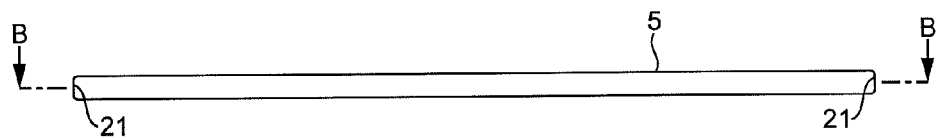
FIG. 8a is an external front view of an elongate air slot machined using a slot drill, intended to illustrate the end profile of the slot.
Figure 8B:
FIG. 8b is a sectional view along the line B-B in FIG. 8a, further illustrating the end profile of the slot.

For example, a disc cutter may be used to cut the slots 5. FIGS. 7a and 7b illustrates the resulting slot profile. A drawback with the use of a disc-cutter is that it produces a radiused end 19 to the slot 5, so that the cross-section of the slot 5—as seen by the airflow—is not uniform. It has been found that this can adversely affect the flow structure around the edges of the slot 5. The problem can be reduced somewhat by increasing the disc cutter radius $r_1$ (FIG. 8b), if this is practical, but only to a degree. In accordance with a further aspect of the invention, the problem is solved by using a slot drill to cut the slot 5 with a straight end 21, as shown in FIGS. 8a and 8b.

Figure 9:
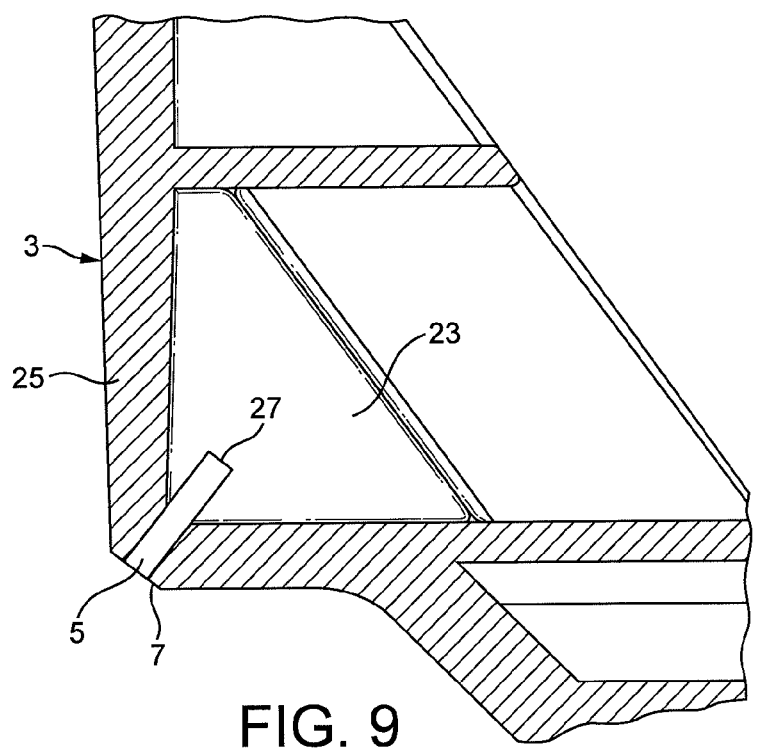
FIG. 9 is a sectional view through a lower part of the dryer in FIG. 3, showing a bracing element moulded integrally as part of the nozzle body, with a slot which has been cut part-way into the bracing element using a flat-nosed cutting tool.

Part of the nozzle body 15 can conveniently be moulded with integral bracing elements and then the slot may be post-machined into this part, so that the bracing elements act to brace the opposing walls of the slots against deformation. This helps maintain a more consistent slot width over the life cycle of the hand dryer. FIG. 9 shows inclusion of a bracing element in the form of a rib 23 on the inside of the main casing 3, extending between the underside 7 of the casing and a front wall 25 of the casing. The slot 5 is cut into the underside 7 of the casing: part way into the rib 23 to help prevent the rib 23 acting as a dividing partition in the slot 5.

Figure 10:
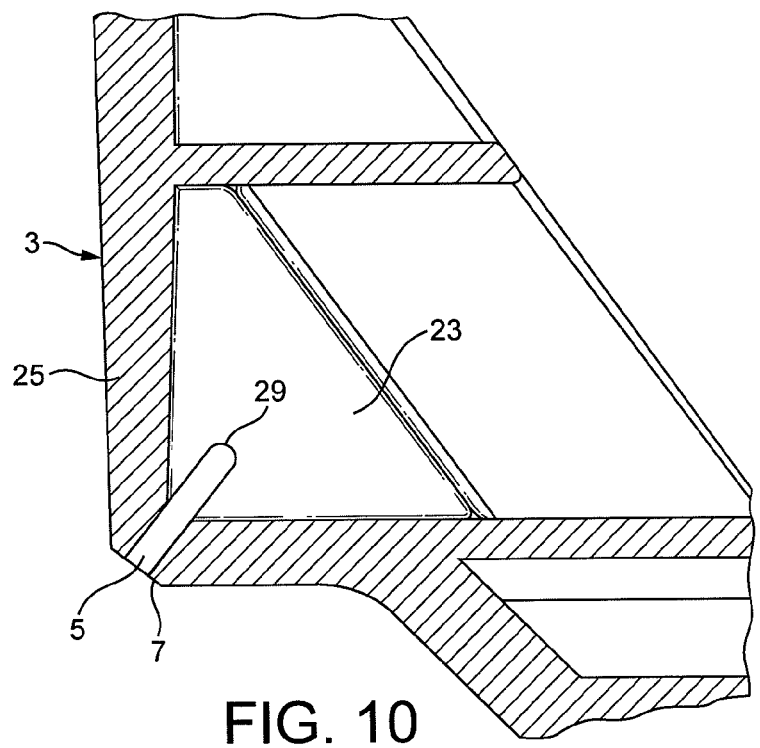
FIG. 10 is a view corresponding to FIG. 9, but illustrating a slot which has been cut part-way into the bracing element using a radiused cutting tool.

FIG. 9 shows a slot which has been cut with a flat-nosed slot drill. In this case, the squared-off end 27 of the slot 5 may act as a stress riser in the rib 23. This can be addressed by using a radiused cutting tool such as a ball-nosed cutter or bull-nosed cutter, to create a radiused end 29 to the slot 5, as shown in FIG. 10.

The invention is not limited to the particular hand dryer 1. For example, the invention may equally be used to manufacture a suitable nozzle part—possibly separate from the main casing—to replace the two-part nozzle in the hand dryer described in EP1909627. If the nozzle part is formed separately from the main casing, then it may be sealed or joined to the main casing in similar manner to the existing two-part nozzle.

The invention claimed is:

1. A method of manufacturing a hand dryer nozzle part, the nozzle part comprising a nozzle body and an air outlet aperture in the nozzle body, the method comprising moulding the nozzle body from plastic as a single part and post-machining the air outlet aperture in the moulded plastic nozzle body in the form of an elongate slot, wherein a length of the slot is less than 1.5 mm in width, and wherein the slot is machined into a part of the nozzle body which is reinforced by one or more bracing elements integrally moulded as part of the nozzle body.

2. The method of claim 1, wherein said length of the slot is greater than 100 mm.

3. The method of claim 1, in which the nozzle body is moulded from Polycarbonate, or a blend of Polycarbonate and Acrylonitrile Butadiene Styrene.

4. The method of one of claims 1, 2 and 3, in which the nozzle body is injection-moulded.

5. The method of claim 1, wherein the bracing elements are reinforcing ribs moulded on the inside of the part.

6. The method of claim 5, wherein the post-machining is carried out using a radiused cutting tool which cuts part way into the reinforcing ribs.

7. The method of claim 1, in which the nozzle body constitutes, or forms part of, an external casing of the hand dryer.

8. A hand dryer comprising a nozzle part, the nozzle part comprising a plastic-moulded nozzle body and a nozzle outlet aperture through which drying air is ejected in use, the nozzle outlet aperture being machined in the moulded nozzle body in the form of an elongate slot, a length of the slot being less than 1.5 mm in width, and wherein the slot is machined into a part of the nozzle body which is reinforced by one or more bracing elements integrally moulded as part of the nozzle body.

9. The hand dryer of claim 8, in which said length of the slot is at least 120 mm, for spanning the width of one or both of a user's hands held—palm open—facing the slot.

10. The hand dryer of claim 8, wherein the bracing elements are reinforcing ribs moulded on the inside of the part.

11. The hand dryer of claim 8, wherein the nozzle body is an external casing of the hand dryer.

\* \* \* \* \*